United States Patent [19]

Hogarth

[11] 3,974,012

[45] Aug. 10, 1976

[54] APPARATUS AND METHOD FOR FORMING TAPERED TUBULAR SHAFTS

[76] Inventor: Harold P. Hogarth, 8605 7th St., Downey, Calif. 90241

[22] Filed: Dec. 5, 1973

[21] Appl. No.: 421,786

[52] U.S. Cl. .............................. 156/161; 156/162; 156/165; 156/173; 156/296; 156/494; 264/229; 428/36
[51] Int. Cl.² .................... B65H 81/00; B32B 31/00
[58] Field of Search .......................... 156/160–165, 156/173, 175, 187, 188, 189, 194, 296, 494; 264/229; 428/36

[56] References Cited
UNITED STATES PATENTS

| | | | |
|---|---|---|---|
| 2,749,643 | 6/1956 | Scott | 156/175 |
| 2,768,921 | 10/1956 | Pigg | 156/194 |
| 2,984,870 | 5/1961 | Warnken | 156/194 |
| 3,156,598 | 11/1964 | Martin | 156/194 |
| 3,442,738 | 5/1969 | Scott et al. | 156/161 |

*Primary Examiner*—Marion E. McCamish
*Assistant Examiner*—Charles E. Lipsey
*Attorney, Agent, or Firm*—William C. Babcock

[57] ABSTRACT

An apparatus and method of using same to form tubular tapered shafts particularly adapted for golf clubs, ski poles, fishing rods and the like. The material used in forming the shafts is a thermo-setting resin sheet that has a number of elongate, laterally spaced, parallel fibers of graphite carbon, boron or like material therein, which fibers have a tensile strength comparable to steel, but are only a fraction of the weight of the latter. The apparatus and method of using the same is characterized by the tubular shaft being formed with exterior and interior cylindrical wall surfaces that are truly concentric, and with the fibers embedded in the polymerized resin being pre-tensioned and spaced from one another. The polymerized resin selected is one that effects a strong bond with the fibers, is more elastic than the material defining the fibers, and as a result the fibers absorbing the major portion of the load when the shaft is transversely flexed such as occurs when it is used as a component in golf clubs and fishing rods. The apparatus is susceptible to being used with other resin impregnated load receiving materials such as powders, fabrics, cloth and the like, but the resulting tubular tapered shafts do not have the strength and operational advantages of shafts that embody graphite carbon or boron fibers as a part thereof.

6 Claims, 9 Drawing Figures

U.S. Patent  Aug. 10, 1976  3,974,012
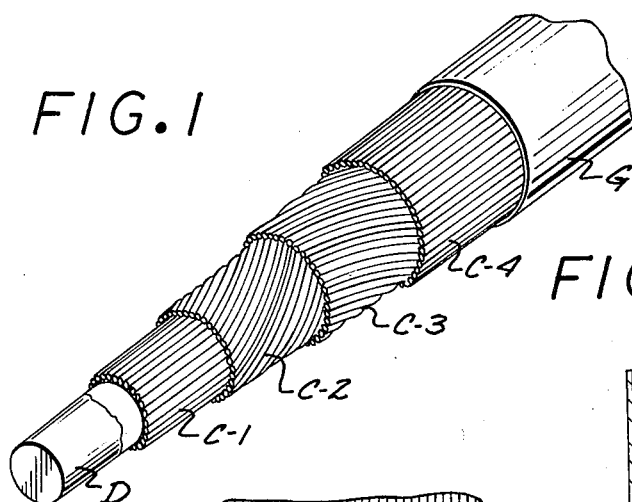
FIG.1
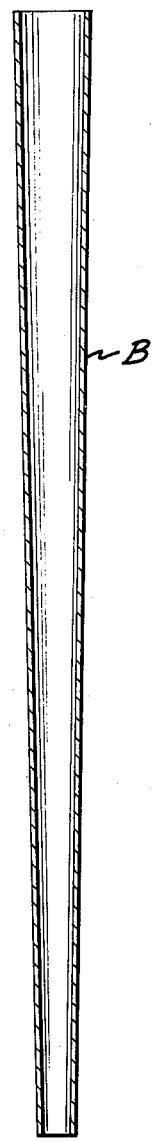
FIG.4
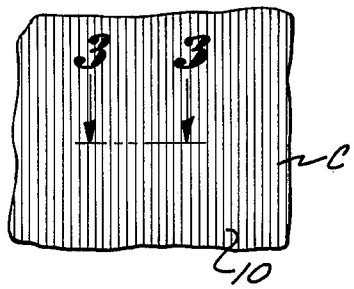
FIG.2
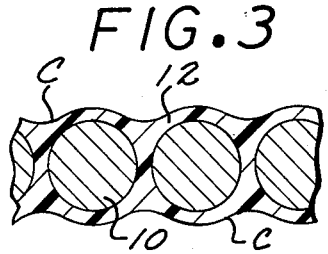
FIG.3
FIG.9
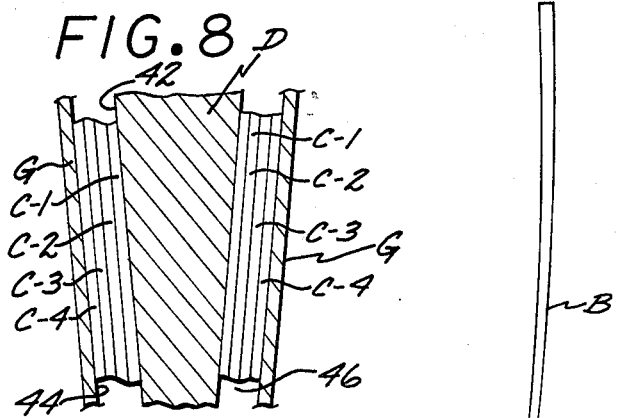
FIG.8
FIG.5
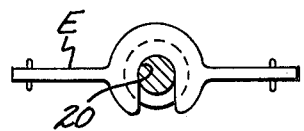
FIG.6

APPARATUS AND METHOD FOR FORMING TAPERED TUBULAR SHAFTS

BACKGROUND OF THE INVENTION

1. Field of the Invention

Apparatus and method for forming tubular tapered shafts.

2. Description of the Prior Art

In the past, attempts have been made to mold a tubular tapered shaft by pressure in an annulus shaped space defined between the interior surface of an elongate tubular shell and the exterior surface of an elongate tapered core. In this process as disclosed in the Robert F. Pigg U.S. Pat. No. 2,768,921 entitled Method of Molding Tapered Rods that issued Oct. 30, 1956 the resulting tapered tubular shaft is of poor quality as no means are provided to maintain the core and shell in true concentric relationship with one another. Furthermore, in the Pigg method the entire annulus shaped space is filled with a resin impregnated glass cloth, and this cloth remaining stationary relative to the shell as the resin polymerizes. The core in the Pigg method moves longitudinally relative to the resin impregnated material in the annulus space, and as a result the interior portion of the Pigg tubular shaft is strong and the exterior portion weak.

This strength of the inner portion of the Pigg tubular shaft is due to at least a portion of the fibers of the glass cloth being pre-tensioned prior to polymerization of the resin due to movement of the core relative to the shell. The outer portion of the Pigg tubular shaft is weak due to the resin impregnated material remaining stationary relative to the shell and there accordingly being no pre-tensioning of the glass fibers therein. Pre-tensioning of the maximum amount of fibers in the polymerized resin is necessary if the finished tubular shaft is to have substantial strength, for it is these pre-tensioned fibers that absorb the major portion of the load when the tubular shaft is flexed transversely as occurs when the shaft is used in a golf club or fishing rod.

If the resin enveloping untensioned fibers is more elastic than the fibers, the resin at the initial flexing of the tubular shaft will take all of the load, and may deform as a result thereof to the extent that it will permanently separate from the fibers. Subsequent flexing of the tubular shaft will cause relative movement between the resin and fibers, and the fibers being of a harder material will cut through the resin to contact adjacently disposed fibers. The breaking of the bonds between the fibers and resin to permit the above described cutting action as the shaft flexes results in rapid deterioration of the shaft which is evidenced by cracks and other physical imperfections appearing therein.

The primary purpose in devising the present invention is to provide an apparatus and method of using the same to form a tubular tapered shaft that is defined by truly concentric exterior and interior sidewall surfaces, and the material from which the shaft is formed being a thermosetting resin that has a number of spaced pre-tensioned fibers developed therein that absorb a major portion of the load as soon as the shaft is initially flexed in a transverse direction.

A further object of the invention is to provide a method by which a tapered tubular shaft is so molded from a thermosetting resin that contracts upon polymerization that the resin is concurrently cured from both the exterior and interior thereof, with the tubular shaft during the application of heat moving longitudinally relative to a tapered mold due to spring loading on a tapered core, and the spring loading being so controlled that spaced elongate graphite carbon or boron fibers enveloped in the resin are pretensioned but not to the extent that the fibers have the resin separating them displaced therefrom to permit the fibers to physically contact one another.

SUMMARY OF THE INVENTION

The method is preferably carried out by using a sheet material of a thermosetting resin of tacky consistency that has a number of laterally spaced, parallel fibers of graphite carbon or boron enveloped therein. The thermosetting resin is of a type that contracts upon polymerization or cross linking. An elongate tapered core having first and second ends has a number of wraps of the sheet wound thereon, with a portion of the wraps having the fibers therein extending longitudinally relative to the core and the balance of the wraps having the fibers therein angularly positioned relative to the core. The wraps are wound one upon the other and are intermediately positioned between first and second end portions of the core. The core is formed from a metal having good heat conducting qualities.

An elongate tubular tapered shell is provided that has first and second end portions. The core is of substantially less transverse cross section than the interior transverse cross section of the shell and cooperates to define a longitudinal annulus shaped space therewith. The wraps on the core are of such thickness as to snuggly fill the annulus space when the core is disposed in the shell, with the first end portion of the core projecting from the shell, and a part of the second end portion of the core projecting from the second end of the shell. The core is formed from a metal having good heat conducting qualities. First and second guides are mounted on first and second ends of the shell to slidably engage first and second end portions of the core to at all times maintain the latter in a centered position relative to the shell. The wraps on the core when the latter is disposed in the shell extend longitudinally from the first end of the shell, to a position that is 1 to 2 inches from the second end of the shell. Spring means are operatively associated with the shell and core when they are assembled as above described that urge the core longitudinally towards the second end of the shell.

The core and shell when assembled as above described are placed in an oven and heated to a temperature at which the resin polymerizes. Heat is transmitted from the oven through the shell to the outermost wrap on the core. Heat is also conducted through the core to the innermost wrap on the core.

The outermost wrap on the tapered core, due to its proximity to the tubular shell will be the first of the wraps to be heated to a temperature where the resin therein will polymerize. Upon polymerization of the resin in the first wrap, the resin therein contracts, and due to this contraction the spring moves the core and the wraps thereon longitudinally towards the second end of the tubular shell. During this longitudinal movement the core is maintained in a centered position relative to the shell by the first and second guides. As such downward movement of the core and the wraps takes place, the fibers in each of the wraps is pre-tensioned, and this pre-tensioning occuring before the resin in which they are enveloped polymerizes. The innermost wraps on the core will be the second wrap that polymerizes as heat is conducted thereto from the oven through the metallic core. Subsequently, heat is transferred from the shell and core through the outermost and innermost wraps to the wraps situated therebetween to cause polymerization of the resin in the intermediately positioned wraps. The spring tension on the core is of the utmost importance, in that, the pressure exerted on the wraps by the spring must be such as to compact the resin in the wraps prior to the polymerization thereof, but not so great as to squeeze resin from between the fibers in the wraps to permit the wraps to physically contact one another. Also, it is important that the polymerized resin have greater degree of elasticity than the elasticity of the fibers embedded therein.

After the resin in the wraps on the core have polymerized as above described, the assembly is removed from the oven and allowed to cool slightly. As the assembly cools, the transverse cross section of the metallic core decreases, and the core may then be easily slid from the formed tapered shaft. After the core has been so removed, the formed tapered shaft is slid from the tapered shell. The tapered shaft that has been formed as above described has the fibers therein pretensioned, and when the shaft is longitudinally flexed, substantially all of the load will be taken longitudinally by the pre-tensioned fibers, and as a result there will be little or no tendency for the fibers to separate from the polymerized resin in which they are embedded. In the event that fibers in the tapered shaft are not pre-tensioned prior to full polymerization of the resin in which they are enveloped, the resin will initially take the load when the shaft is transversely flexed, and in so doing, the fibers will tend to cut through the cured resin. This cutting ultimately causes deterioration of the shaft which is evidenced by cracking of the shaft or the forming of other imperfections therein.

BRIEF DESCRIPTION OF THE DRAWINGS

FIG. 1 is a perspective view of a tapered elongate metallic core that has a number of wraps of a thermosetting resin sheet wound thereon, with each wrap enveloping a number of parallel, laterally spaced fibers of graphite carbon, or boron therein and the core and the wraps prior to polymerization of the resin being disposed within the confines of a tapered metallic shell;

FIG. 2 is a top plan view of a section of a sheet material defining one of the wraps;

FIG. 3 is a fragmentary transverse cross sectional view of the sheet material shown in FIG. 2 taken on the line 3—3 thereof;

FIG. 4 is a combined side elevational and longitudinal cross sectional view of an apparatus used in molding a tubular shaft from the material shown in FIG. 1 and the material occupying a position in the apparatus that occurs prior to the resin in the wraps being polymerized;

FIG. 5 is a longitudinal cross sectional view of the lower portion of the apparatus shown in FIG. 4, but illustrating the position the core and wrap occupy relative to the shell after the resin in the wrap has been polymerized;

FIG. 6 is a top plan view of the apparatus shown in FIG. 4 taken on the line 6—6 thereof;

FIG. 7 is a longitudinal cross sectional view of the molded tubular shaft;

FIG. 8 is a fragmentary longitudinal cross sectional view of the core, shell and wraps situated therebetween, which is exaggerated both as to width and angulation; and FIG. 9 is a side elevational view of the completed tubular shaft and showing the same in a transversely flexed position.

DESCRIPTION OF THE PREFERRED EMBODIMENT

The apparatus A shown in FIG. 4 may be used to form the tubular elongate tapered shaft B illustrated in FIG. 7. The sheet material C shown in FIGS. 2 and 3 is particularly adapted for use with the apparatus A. Each sheet C includes a number of elongate fibers 10 that are preferably graphite carbon, boron or a like material having a high tensile strength that are embedded in parallel, laterally spaced relationship in a body 12 of a thermo-setting resin. Resins such as phenolic resins, alykds, amino resins, polyesters, epoxies, polyurethanes, phenolfurfutal resins, urea resins and the like that polymerize and cross link upon being heated to a predetermined temperature, may be employed to define body 12. The thermo-setting resin that is chosen should be one that is resilient when polymerized, as well as one that effects a strong bond with the fibers 10, when the resin is cured. The cured resin should be longitudinally elastic to the extent that when the cured shaft B flexes as shown in FIG. 9 both the resin and fibers will longitudinally deform within their elastic limits and without rupturing the bond therebetween that maintains them together as an integral unit.

That apparatus A as shown in FIG. 4 includes an elongate tapered metal core D that has a first end portion 14 and a second end portion 16. The first end portion 14 is preferably straight walled and cylindrical in configuration for reasons that will later be apparent. The core D is formed from a metal that has good heat conducting qualities such as steel or the like. The first end portion 14 as may be seen in FIG. 4 has a transverse circular slot 18 thereon that may be removably engaged by a cross member E. The slot 18 is removably engaged by a recessed portion 20 of the cross member E as shown in FIG. 6.

A first tubular guide F is provided that has a first bore 22 extending longitudinally therein, which on the lower end thereof develops into a circular body shoulder 24, and the body shoulder in turn developing into a second bore 26 of larger diameter than the first bore 22 with which it is coaxially aligned. The first guide F has a transverse tapped bore 28 therein that is engaged by a thumb screw 30. By use of the thumb screw 30, the first guide F may be removably mounted on a first end portion 32 of the tubular tapered shell G as shown in FIG. 4.

The tapered shell G has a second end portion 34 of smaller transverse cross section than first end portion 32. The second end portion 34 is removably engaged by a second guide F' that is substantially identical in structure to the first guide F but is smaller in size. The same numerals used in identifying the components in second guide F', but with primes being added thereto.

A circular anchor H is provided as may be seen in FIG. 4 that has a tapered bore 36 extending therethrough, and this bore 36 engaging the exterior surface of the tapered shell G when the anchor is moved upwardly thereon to the position shown in FIG. 4. A second cross member E' is provided that removably engages the tubular shell G, and is prevented from moving upwardly beyond a predetermined longitudinal position thereon, due to contacting the anchor H as shown in FIG. 4. The first and second cross members E and E' have openings 38 and 38' formed in the end portions thereof, and these openings being removably engaged by hooks 40 and 40' formed on the end portions of two identical tensioned helical springs K and K' as shown in FIG. 4.

In using the apparatus A the sheet material C is cut into wraps, which wraps are extended and wound transversely around the core D as shown in FIG. 1. For simplicity of explanation, the four wraps shown in FIGS. 4 and 8 are identified by the notations C-1, C-2 C-3 and C-4. The first wrap C-1 has the fibers 10 therein extending longitudinally relative to the core D. The second wrap C-2 overlies the first wrap C-1, but with the fibers 10 therein being angularly disposed to those in the first wrap C-1. The third wrap C-3 overlies the second wrap C-2 but with the fibers in the third wrap being angularly disposed in a direction opposite to the fibers in C-2. The fourth wrap C-4 overlies wrap C-3 and the fibers 10 therein extending longitudinally relative to the core D. The outer surface 42 of core D and the interior sidewall surface 44 of the shell G cooperate to define an elongate annulus shaped space 46 therebetween and the thickness of the wraps C-1 to C-4 inclusive being such that the core D with the wraps C-1 to C-4 inclusive thereon may be slipped into the shell G as shown in FIG. 4. When the core D with the wraps C-1 to C-4 thereon is positioned as shown in FIG. 4, the tension springs K and K' are exerting pressure on the wraps C-1 to C-4, and the core D will be held in a truly centered position relative to the shell G due to slidably engaging the first and second guides F and F'. The resin 10 in the wraps C-1, C-2, C-3 and C4 is sufficiently tacky that the wraps will adhere to one another when disposed as shown in FIG. 1.

The assembly as shown in FIG. 4 is now placed in an oven and at a temperature at which the resin 12 will polymerize and cross link. The fourth wrap C-4 due to being adjacently disposed to the shell G will have heat transferred thereto through the shell more rapidly than the balance of the wraps. The fourth wrap C-4, as the resin polymerizes, decreases in volume and due to a lessening of the diameter of the wrap C-4 and the tension spring K and K' move the core D and wraps C-1 to C-4 inclusive longitudinally as a unit in the shell G towards the second end portion 34 thereof. It will be noted in FIG. 4 that the wraps C-1, C-4 terminate on the core D a substantial distance above the shoulder 24' of the second guide F', to provide a longitudinally extending annulus shaped space 46 between core D and shell G in which downward movement of the wraps C-1 to C-4 inclusive may take place. As downward movement of the core D takes place on additional part of the second end portion 16 thereof emerges from second guide F' as shown in FIG. 5.

Heat is also conducted through the core D to the first wrap C-1, and the resin 12 therein polymerizes and cross links to contract in volume. However, the wrap C-1 due to being in contact with the rigid core D cannot have the interior diameter of the wrap decreased. Accordingly, the decrease in volume of the resin in the wrap C-1 will be evidenced by a thinning of the thickness thereof. As such thinning occurs, the tension springs K and K' will tend to move to core D, and the wrap C-1 towards the second end 26 of the shell G, and in so doing the fibers 10 in the first, second, third and fourth warps C-1 to C-4 inclusive will be pre-tensioned.

Subsequently heat is transferred through the wraps C-1 and C-4 to the internally positioned wraps C-2 and C-3 to cause the resin therein to polymerize and cross link.

After the resin 12 in each of the wraps C-1 to C-4 inclusive is polymerized and cross linked the core D and wraps C-1 to C-4 inclusive thereon will have moved downwardly relative to the tapered shell G to occupy the position shown in FIG. 5. After the assembly as shown in FIGS. 4 and 5 has been exposed to the heat of an oven (not shown) or other heating means for a sufficient length of time for the resin 12 in each of the wraps C-1 and C-4 to polymerize, the assembly is removed from the oven. The springs K and K' are now removed from the apparatus A and the core D is slid outwardly from the shaft B. Such outward movement is possible for as the core D cools it contracts transversely, and separates from the shell B to the extent that it may be easily slid therefrom. The tapered shaft G is now slid from the shell G while it is still hot. The shaft B is now allowed to cool, and after such cooling is ready for future use in such articles of manufacture as golf clubs, fishing rods and the like.

When the finished shaft G is flexed transversely as shown in FIG. 9, the fibers 10 due to being pretensioned take substantially all of the longitudinal load, as the resin 12 is more elastic than the material forming the fibers. Accordingly, there is little or no tendency to break the bond between the fibers 10 and resin 12 as the shaft G flexes. The polymerized resin 12 during such flexing maintains the fibers 10 is spaced relationship, and there is no deterioration of the fibers due to them coming into rubbing contact with one another.

The structure of the apparatus and method of using the same to form a tapered rod B has been explained previously and need not be repeated.

I claim:

1. A method of forming an elongate tubular tapered shaft that has a interior sidewall surface that is concentrically centered relative to an exterior sidewall surface of said shaft from a plurality of wraps of a sheet thermo-setting resin of tacky consistency that contracts in volume upon polymerizing that has a plurality of laterally spaced, parallel pretensioned fibers enveloped therein that are formed from a material that has a greater tensile strength than said resin when the latter is polymerized and said resin when polymerized having a greater degree of elasticity than said material forming said fibers, which method includes the steps of:

a. winding said wraps transversely about a first elongate tapered heat conducting body having first and second end portions, said wraps overlying one another and being intermediately disposed between said first and second end portions, with the tapered external surface of said body between said first and second end portions being that of said interior sidewall surface, said second end of said first body being of smaller transverse cross section than said first end of said first body, said wraps being sufficient in number to provide at least an interior wrap and an exterior wrap when wound on said first body and the fibers in at least one of said wraps being parallel to the longitudinal axis of said shaft;

b. sliding said first body and wraps into the confines of a second heat conducting body that defines an elongate interior surface that has a tapered configuration that is the same as said external sidewall surface, said second body having first and second ends, with said second end of smaller transverse cross section than said first end of said second body, and the longitudinal spacing between said first and second ends being greater than the length of said wraps on said first body to provide a longitudinal annulus shaped space between said second end of said first body and said second end of said second body adjacent said second end of the latter;

c. maintaining said first body in substantially true concentric relationship with said second body;

d. applying a longitudinally directed spring generated force of predetermined constant magnitude to said first body that tends to move said first body and wraps relative to said second body towards said second end of said second body with said predetermined magnitude sufficient to compact said resin in said wraps to define a unified mass but not sufficient to squeeze said resin from between said fibers to permit the latter to physically contact one another;

e. heating all of said second body and at least said first end portion of said first body to an elevated temperature at which said resin polymerizes with said resin in said outermost wrap as it polymerizes contracting in volume and allowing said outermost wrap, said first body, and the balance of said wraps to move longitudinally as a unit in said second body towards said second end thereof until the external surface of the polymerized outermost wrap is disposed at a section of said interior surface of said second body that is of substantially the same size and shape as the exterior surface of said first wrap that has said resin therein polymerized;

f. continuing to heat said first end portion of said first body for said heat to flow longitudinally therethrough to heat said innermost wrap to a temperature at which said resin therein polymerizes and contracts in volume, with said force as said resin in said innermost wrap contracts moving said first body and said innermost wrap towards said second end of said second body and relative to said second body and outermost wrap to pretension at least a portion of said fibers in said innermost and outermost wraps and in any of said wraps intermediately disposed between said innermost and outermost wraps;

g. continuing to heat said second body and at least said first end portion of said first body for heat to flow therefrom through said innermost and outermost wraps to polymerize the resin in intermediately positioned wraps therebetween;

h. terminating the application of said force to said first body after said resin in all of said wraps has been polymerized; and i. separating said first and second bodies from said wraps that have had said resin therein polymerized and which now constitute said tubular tapered shaft in which at least a portion of said fibers therein are pre-tensioned and immediately take the major portion of the load when said shaft is transversely flexed.

2. A method as defined in claim 1 in which said fibers in said innermost and outermost wraps are parallel to the longitudinal axis of said shaft, and said fibers in at least a portion of said intermediately disposed wraps between said innermost and outermost wraps are angularly disposed relative to said longitudinal axis of said shaft.

3. A method as defined in claim 2 in which said intermediately disposed wraps have first and second equal portions thereof, with the fibers in said first and second portions angularly disposed relative to the longitudinal axis of said shaft in opposite directions.

4. A method as defined in claim 1 in which said second end portion of said first body moves outwardly relative to said second end of said second body as said resin in said wraps polymerizes, and said second end portion of said first body as well as said first end portion of said first body being heated to heat said innermost wrap.

5. A method as defined in claim 1 in which said first and second bodies are separated from said elongate tubular shaft when said first, and second bodies and said elongate tubular shaft are at a temperature above that of the ambient atmosphere.

6. A method as defined in claim 1 in which said fibers are elongate and selected from the class consisting of graphite carbon, boron, and glass.

* * * * *